United States Patent Office 3,171,844
Patented Mar. 2, 1965

3,171,844
20-(ALIPHATIC HYDROCARBONTHIO) AND 20-(SUBSTITUTED ALIPHATIC HYDROCARBONTHIO) PREGNANE DERIVATIVES
Alexander D. Cross, Mexico City, Mexico, assignor to Syntex Corporation, Panama, Panama, a corporation of Panama
No Drawing. Filed May 24, 1963, Ser. No. 282,845
22 Claims. (Cl. 260—397.1)

This invention relates to novel cyclopentanopolyhydrophenanthrene derivatives and to processes for their preparation.

More particularly, this invention relates to novel 20-(aliphatic hydrocarbonthio)- and 20-(substituted aliphatic hydrocarbonthio) pregnane derivatives represented by the general formulas:

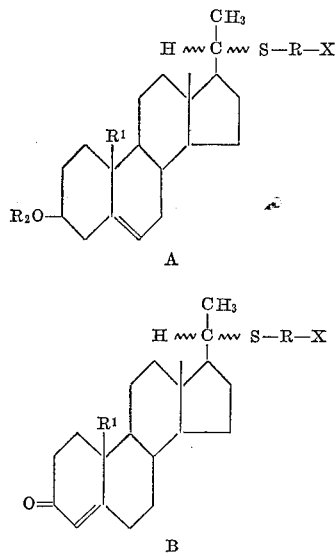

In these formulas R represents a saturated or unsaturated, straight or branched chain aliphatic hydrocarbon residue containing from 1 to 7 carbon atoms, inclusive, such as ethylene, i.e., —$CH_2$-$CH_2$—, propylene, butylene, but-1-enylene, but-1-inylene, 2-methylbutylene, 2,3-dimethylbutylene, 2-methylbut-2-enylene, 2,3-dimethylbut-2-enylene, 2,3-dimethylpentylene, 2,3-dimethylpent-2-enylene, hexamethylene, and the like; $R^1$ represents hydrogen or a methyl group, and X, which is substituted on a primary, secondary or tertiary carbon atom of the group R, represents hydrogen [in this case R and X taken together can represent, for example, a 3'-methylbutyl (isoamyl) or 3'-methylbut-2'-enyl radical], a halogen, e.g., fluorine or chlorine, an N,N-dialkylamino group, preferably an N,N-di-lower)alkylamino group such as N,N-dimethylamino and the like, a hydroxyl group (in this case R and X taken together can represent, for example, a 3'-methyl-3'-hydroxybutyl radical), an acyl group, a cyano group, or a carboxyl group.

The symbol ⸺ at the 20-position in the above formulas and in those that follow signifies that the hydrogen, aliphatic hydrocarbonthio and substituted aliphatic hydrocarbonthio substituents at the 20-position can be in either the α- or the β-configuration.

The acyl and acyloxy groups referred to hereinabove are derived from carboxylic acids, preferably hydrocarbon carboxylic acids, of less than 12 carbon atoms. These acids can be saturated or unsaturated, of straight, branched, cyclic or cyclic-aliphatic chain, or aromatic, and may be substituted with functional groups such as hydroxyl groups, alkoxy groups containing up to 5 carbon atoms, acyloxy groups containing up to 12 carbon atoms, nitro groups, amino groups and halogens. Typical ester groups are the acetate, trimethylacetate, t-butylacetate, aminoacetate, phenoxyacetate, propionate, β-chloropropionate, cyclopentylpropionate, enanthate, and benzoate.

The novel 20-(aliphatic hydrocarbonthio)- and 20-(substituted aliphatic hydrocarbonthio) pregnenes represented by Formulas A and B above are progestational agents, and in addition are of great utility in lowering blood cholesterol levels.

The compounds of the present invention can be obtained by the methods illustrated by the following sequence of reactions:

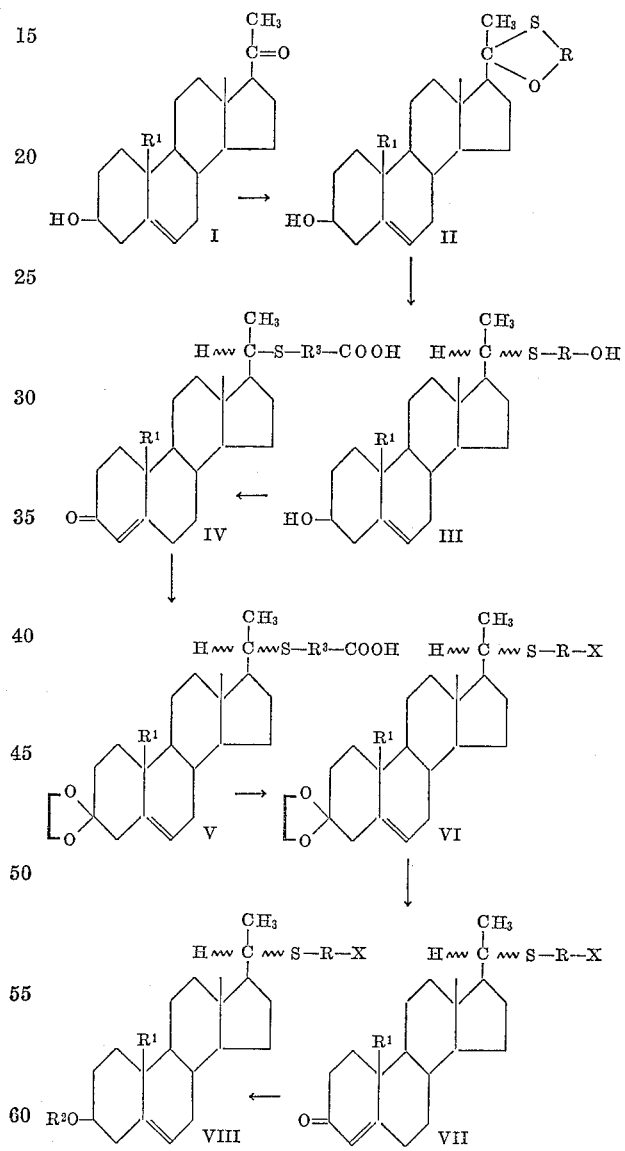

In the above formulas each of R, $R^1$, $R^2$ and X have the same meanings as set forth hereinabove for Formulas A and B, and $R^3$ represents a saturated or unsaturated, straight or branched chain aliphatic hydrocarbon residue containing one less carbon atom than the group R in the preceding compound (III).

In practicing the methods outlined above, the starting material (I), i.e., pregnenolone or 19-nor pregnenolone, is reacted with a monothioglycol of up to 7 carbon atoms, such as β-mercaptoethanol, γ-mercaptopropanol, 1-mercaptopropanol-2, δ-mercaptobutanol, and the like, to yield the corresponding 20-monothioketal (II), e.g., 20-(cycloethylenethiooxy)-pregnenolone, or the corresponding 19-nor compound. This reaction will generally be carried out in the presence of a strong acid, e.g., p-toluenesulfonic acid and the like, preferably in solution in an inert organic solvent such as benzene and the like, at reflux temperature, and will usually take about 12 hours, although longer or shorter reaction times coupled with lower or higher temperatures may be employed if desired.

The 20-monthioketal (II) is then heated with a cleaving agent, as described in my copending U.S. patent application Serial No. 282,848, filed on May 24, 1963 e.g., a double metal hydride containing at least one element of sub-group IIIA of the Periodic Chart [as set forth at pages 56 and 57 of "Lange's Handbook of Chemistry," Ninth Edition (Sandusky, Ohio: Handbook Publishers, Inc., 1956)], such as lithium aluminum hydride, potassium aluminum hydride, magnesium aluminum hydride, lithium gallium hydride, zinc aluminum hydride, sodium borohydride, potassium borohydride, aluminum borohydride, and the like, together with a Lewis acid containing no active hydrogen, and preferably a Lewis acid containing an element having an atomic number of 26 to 28 inclusive or an element of subgroup IIIA of the Periodic Chart, such as ferric chloride, boron trifluoride, boron trichloride, aluminum fluoride, aluminum chloride, aluminum bromide, gallium chloride, and the like, to yield the corresponding $20\alpha$- and $20\beta$-(hydroxy aliphatic hydrocarbonthio)-$\Delta^5$-pregnenes or their 19-nor derivatives (III), e.g., $20\alpha$- and $20\beta$-(2'-hydroxyethylthio)-$\Delta^5$-pregnen-3-$\beta$-ol being obtained by reacting 20-(cycloethylenethioxy)-$\Delta^5$-pregnen-3$\beta$-ol with lithium aluminum hydride and aluminum chloride in tetrahydrofuran. This reaction will generally be carried out in an organic solvent having an ether function in its molecule, e.g., diethyl ether, tetrahydrofuran and the like, at a temperature ranging from room temperature (about 25° C.) or lower to reflux temperature or above for a period of time ranging anywhere from about 30 minutes to about 24 hours. The $20\alpha$- and $20\beta$-derivatives can be separated by conventional chromatographic methods.

These $20\alpha$- and $20\beta$-(hydroxy aliphatic hydrocarbonthio)-$\Delta^5$-pregnenes and 19-nor pregnenes, e.g., $20\alpha$- and $20\beta$ - (2' - hydroxyethylthio) - $\Delta^5$-pregnen-3$\beta$-ol, when treated under conventional Oppenauer conditions followed by Jones' oxidation (e.g., with 8 N chromic acid), yield the correspondng 20-(carboxy aliphatic hydrocarbonthio)-$\Delta^4$-pregnen-3-ones and their 19-nor derivatives (IV) having one less carbon atom in the group R than the preceding compounds, e.g., $20\alpha$- and $20\beta$-(carboxymethylthio)-$\Delta^4$-pregnen-3-one.

The 3-keto group in these carboxy derivatives (IV) is then protected by ketalization, e.g., using ethylene glycol in the presence of p-toluenesulfonic acid. Thus, $20\alpha$- and $20\beta$-(carboxymethylthio)-$\Delta^4$-pregnene-3-one and the corresponding 19-nor compounds yield 3-(cycloethylenedioxy)-$20\alpha$- and $20\beta$-(carboxymethylthio)-$\Delta^5$-pregnene and the corresponding 19-nor compounds (V).

Reduction of these 3-ketals (V), e.g., with lithium aluminium hydride, affords the corresponding 3-ketals of the $20\alpha$- and $20\beta$-(hydroxy aliphatic hydrocarbonthio)-$\Delta^5$-pregnenes and their 19-nor derivatives (VI; X=OH), e.g., 3-(cycloethylenedioxy)-$20\alpha$- and $20\beta$-(2'-hydroxyethylthio)-$\Delta^5$-pregnene.

These 3-ketals of the $20\alpha$- and $20\beta$-(hydroxy aliphatic hydrocarbonthio)-$\Delta^5$-pregnenes and their 19-nor derivatives, when tosylated by known procedures, e.g., using tosyl chloride in pyridine, yield the corresponding 3-ketals of 20-(tosyloxy aliphatic hydrocarbonthio)-$\Delta^5$-pregnenes and their 19-nor derivatives, e.g., 3-(cycloethylenedioxy) - $20\alpha$- and $20\beta$-(2'-tosyloxyethylthio)-$\Delta^5$-pregnene.

These tosylated intermediates, when heated at reflux temperature with an alkali metal halide, such as lithium chloride, potassium fluoride, potassium chloride, sodium chloride, and the like, preferably in an inert organic solvent such as dimethylformamide and the like, yield the corresponding 3-ketals of the 20-(halo aliphatic hydrocarbonthio)-$\Delta^5$-pregnenes and their 19-nor derivatives (VI; X=halogen), e.g., 3-(cycloethylenedioxy)-$20\alpha$- and $20\beta$-(2'-fluoroethylthio)-$\Delta^5$-pregnene being obtained by reacting 3-(cycloethylenedioxy)-$20\alpha$- and $20\beta$-(2'-tosyloxyethylthio)-$\Delta^5$-pregnene with potassium fluoride.

Similarly, treatment of the 20-(tosyloxy aliphatic hydrocarbonthio)-pregnene and 19-nor pregnene intermediates with a dialkyl amine, preferably a di(lower)alkyl amine such as dimethyl amine, diethyl amine, methyl propyl amine, and the like, preferably in solution in an inert organic solvent such as dioxane and the like, gives the corresponding 3-ketals of the 20-(N,N-dialkylamino aliphatic hydrocarbonthio)-$\Delta^5$-pregnenes and their 19-nor derivatives [VI; X=N(alkyl)$_2$], e.g., 3-(cycloethylenedioxy)-$20\alpha$- and $20\beta$-[2'-(N,N-dimethylamino)-ethylthio]-$\Delta^5$-pregnene.

Treatment of the tosyloxy intermediates with an alkali metal cyanide, e.g., sodium cyanide, potassium cyanide, and the like, preferably in solution in an inert organic solvent such as acetonitrile and the like, produces the corresponding 3-ketals of the 20-(cyano aliphatic hydrocarbonthio)-$\Delta^5$-pregnenes and their 19-nor derivatives (VI; X=CN), e.g., 3-(cycloethylenedioxy)-$20\alpha$- and $20\beta$-(2'-cyanoethylthio)-$\Delta^5$-pregnene.

These 20-(cyano aliphatic hydrocarbonthio) compounds, when subjected to conventional basic hydrolysis, e.g., using sodium hydroxide, or the like, afford the corresponding 3-ketals of the 20-(carboxy aliphatic hydrocarbonthio)-$\Delta^5$-pregnenes and their 19-nor derivatives (VI; X=COOH), e.g., 3-(cycloethylenedioxy)-$20\alpha$- and $20\beta$-(2'-carboxyethylthio)-$\Delta^5$-pregnene being obtained by hydrolyzing the cyano groups in 3-(cycloethylenedioxy)-$20\alpha$- and $20\beta$-(2'-cyanoethylthio)-$\Delta^5$-pregnene.

Treatment of the 20-(carboxy aliphatic hydrocarbonthio) compounds with a lower alkyl magnesium halide, such as methyl magnesium bromide and the like, under conventional conditions, produces the corresponding 3-ketals of the 20-(n'-hydroxy-n'-alkyl aliphatic hydrocarbonthio)-$\Delta^5$-pregnenes and their 19-nor derivatives (VI; X=OH), n' being the carbon atom of the aliphatic hydrocarbonoxy group to which the hydroxy and alkyl groups are attached, e.g., 3-(cycloethylenedioxy)-$20\alpha$- and $20\beta$-(3'-hydroxy - 3' - methylbutylthio)-$\Delta^5$-pregnene being the products resulting from the reaction of 3-(cycloethylenedioxy)-$20\alpha$- and $20\beta$ - (2' - carboxyethylthio)-$\Delta^5$-pregnene with methyl magnesium bromide. Dehydration of these 20-(n'-hydroxy-n'-alkyl aliphatic hydrocarbonthio) intermediates, for example by treatment with mesyl chloride in dimethylformamide-pyridine at about 80° C. for about 3 hours, results in the corresponding 3-ketals of the 20-(unsaturated aliphatic hydrocarbonthio)-$\Delta^5$-pregnenes and their 19-nor derivatives (VI; X=H, R is unsaturated), e.g., 3-(cycloethylenedioxy)-$20\alpha$- and $20\beta$-(3'-hydroxy - 3' - methylbutylthio)-$\Delta^5$-pregnene yielding, on dehydration, 3-(cycloethylenedioxy)-$20\alpha$- and $20\beta$-(3'-methylbut - 2' - enylthio)-$\Delta^5$-pregnene. Catalytic hydrogenation of these 17-(unsaturated alphatic hydrocarbonthio)-$\Delta^5$-pregnenes and the corresponding 19-nor compounds, e.g., at atmospheric pressure using a 5% palladium-on-charcoal catalyst, results in the corresponding 3-ketals of the $20\alpha$- and $20\beta$-(saturated aliphatic hydrocarbonthio)-$\Delta^5$-pregnenes and their 19-nor derivatives (VI; X=H, R is saturated), e.g., 3-(cycloethylenedioxy)-$20\alpha$- and $20\beta$-(3'-methylbut - 2' - enylthio)-$\Delta^5$-pregnene yield, on catalytic hydrogenation, 3-(cycloethylenedioxy)-$20\alpha$- and $20\beta$-(isoamylthio)-$\Delta^5$-pregnene.

All of the aforementioned 3-ketal-$\Delta^5$-pregnene derivatives (VI) can be converted into the corresponding $\Delta^4$-pregnen-3-ones (VII) by conventional acid hydrolysis, e.g., using hydrochloric acid.

Treatment of the $\Delta^4$-pregnen-3-ones (VII) with an organic acid anhydride, preferably mixed with the corresponding acid chloride, e.g., a mixture of acetic anhydride and acetyl chloride, at reflux temperature, gives the corresponding enol acylates which, upon reduction with an alkali metal borohydride, e.g., sodium borohydride and the like, in an ethanol-tetrahydrofuran solution for about 3 hours at about 0° C. to 5° C., followed by refluxing of the resulting reaction product with a base, such as sodium hydroxide and the like, afford the corresponding 20-(aliphatic hydrocarbonthio) and -(substituted aliphatic hydrocarbonthio)-Δ⁵-pregnen-3β-ols and their 19-nor derivatives (VIII; R²=H).

The compounds of the present invention having a primary or a secondary hydroxyl group are preferably acylated by reaction with a suitable acid chloride or anhydride in pyridine in the manner well known in the art, while the compounds of the present invention having a tertiary hydroxyl group are preferably esterified by reaction with a suitable acid anhydride in pyridine, in the presence of an acid catalyst such as p-toluenesulfonic acid and the like, again in the manner well known in the art.

The following specific examples serve to illustrate, but are not intended to limit the scope of the present invention.

*Example I*

A mixture of 5 g. of pregnenolone, 150 cc. of anhydrous benzene, 60 cc. of β-mercaptoethanol and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenethioxy-Δ⁵-pregnen-3β-ol (Compound No. 1).

*Example II*

A solution of 1 g. of compound No. 1 in 50 cc. of tetrahydrofuran was added over a 30 minutes period to a stirred suspension of 1 g. of lithium aluminum hydride and 5 g. of aluminum trichloride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which after chromatography on alumina and crystallization of the solid fractions from acetone-hexane yielded 20β-(2'-hydroxyethylthio)-Δ⁵-pregnen-3β-ol (Cpd. No. 2) and 20α-(2'-hydroxyethylthio)-Δ⁵-pregnen-3β-ol (Cpd. No. 3).

*Example III*

A solution of 1 g. of compound No. 2 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 20β-(2'oxoethylthio)-Δ⁴-pregnen-3-one (Cpd. No. 4).

*Example IV*

A solution of 1 g. of compound No. 4 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 20β-(carboxymethylthio)-Δ⁴-pregnen-3-one (Cpd. No. 5).

*Example V*

The compound No. 5 was treated according to Example I except that ethyleneglycol was used instead of β-mercaptoethanol thus yielding 3-cycloethylenedioxy-20β-(carboxymethylthio)-Δ⁵-pregnene (Cpd. No. 6).

*Example VI*

A solution of 1 g. of compound No. 6 in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane, thus giving 3-cycloethylenedioxy-20β-(2'-hydroxyethylthio)-Δ⁵-pregnene (Cpd. No. 7).

*Example VII*

A solution of 1 g. of compound No. 7 in 5 cc. of pyridine was treated with 0.5 g. of tosyl chloride and kept at room temperature for 24 hours; it was then diluted with water and the precipitate separated by filtration, thus giving 3-cycloethylenedioxy-20β-(2'-tosyloxyethylthio)-Δ⁵-pregnene (Cpd. No. 8).

*Example VIII*

A suspension of 10 g. of potassium fluoride in 50 cc. of dimethyl formamide was heated to boiling and then a solution of 2 g. of compound No. 8 in 10 cc. of dimethyl formamide was added. The mixture was refluxed for 5 hours, cooled and poured into water. The formed precipitate was filtered off and crystallized to give 3 - cycloethylenedioxy - 20β - (2' - fluoroethylthio) - Δ⁵-pregnene (Cpd. No. 9).

*Example IX*

The compound No. 8 was treated according to Example VIII, except that potassium chloride was used instead of potassium fluoride, thus yielding 3-cycloethylenedioxy-20β-(2'-chloroethylthio)Δ⁵-pregnene (Cpd. No. 10).

*Example X*

A solution of 1 g. of compound No. 8 in 50 cc. of dioxane was treated with a constant stream of dimethylamine during 48 hours. Thereafter, the solution was boiled under reflux for 30 minutes and poured into water, thus affording a precipitate which was filtered off, dried and recrystallized from methanol-benzene, thus furnishing 3 - cycloethylenedioxy - 20β - (2' - [N,N - dimethylamino]-ethylthio)-Δ⁵-pregnene (Cpd. No. 11).

*Example XI*

A mixture of 1 g. of compound No. 8, 1 g. of potassium cyanide and 50 cc. of acetonitrile was kept at 100° C. for 3 hours. The mixture was then poured into water, and the formed precipitate filtered off, dried and crystallized from acetone-hexane thus yielding 3-cycloethylenedioxy-20β-(2'-cyanoethylthio) - Δ⁵ - pregnene (Cpd. No. 12).

*Example XII*

A mixture of 1 g. of compound No. 12 and 50 cc. of a 5% solution of sodium hydroxide in methanol was refluxed during 4 hours, then cooled, neutralized with acetic acid and diluted with water. The formed precipitate was collected by filtration and recrystallized from acetone-hexane, thus yielding 3-cycloethylenedioxy-20β-(2'-carboxyethylthio)-Δ⁵-pregnene (Cpd. No. 13).

Example XIII

A solution of 5 g. of compound No. 13 in 250 cc. of thiophene-free benzene was treated with 55 cc. of 4 N-methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3 - cycloethylenedioxy-20β-(3'-hydroxy-3'-methylbutylthio)-Δ⁵-pregnene (Cpd. No. 14).

Example XIV 1 g. of compound No. 14 was dissolved with slow heating in 12.5 cc. of dimethyl formamide, the mixture was cooled, 0.42 g. of mesyl chloride and 0.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 3 - cycloethylenedioxy-20β-(3'-methyl-but-2'-enylthio)-Δ⁵-pregnene (Cpd. No. 15).

Example XV

A suspension of 0.5 g. of 5% palladium on charcoal catalyst in 50 cc. of methanol was hydrogenated for 30 minutes. A solution of 2 g. of compound No. 15 in 200 cc. of methanol was added to the catalyst and stirred under a hydrogen atmosphere until one mol equivalent of hydrogen was taken up. After removal of the catalyst by filtration the solution was evaporated and the crude residue was purified by crystallization from methylene chloride-hexane, thus giving 3-cycloethylenedioxy-20β-(isoamylthio)-Δ⁵-pregnene (Cpd. No. 16).

Example XVI

A solution of 500 mg. of compound No. 7 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 20β-(2'-hydroxyethylthio)-Δ⁴-pregnen-3-one (Cpd. No. 17).

The compounds Nos. 9, 10, 13, 14, 15 and 16 were treated according to the same procedure, thus affording respectively:

Cpd. No.:
    18—20β-(2'-fluroethylthio)-Δ⁴-pregnen-3-one,
    19—20β-(2'-chloroethylthio)-Δ⁴-pregnen-3-one,
    20—20β-(2'-carboxyethylthio)-Δ⁴-pregnen-3-one,
    21—20β-(3'-hydroxy-3'-methyl-butylthio)-Δ⁴-pregnen-3-one,
    22—20β-(3'-methyl-but-2'-enylthio)-Δ⁴-pregnen-3-one,
    23—20β-(isoamylthio)-Δ⁴-pregnen-3-one.

Example XVII

A solution of 5 g. of compound No. 17 in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 3-acetoxy-20β-(2'-acetoxyethylthio)-Δ³,⁵-pregnadiene (Cpd. No. 24).

A solution of 5 g. of compound No. 24 in a mixture of 100 cc. of 95% ethanol and 35 cc. of tetrahydrofuran was cooled to 10° C. and added dropwise, with occasional stirring over a 1 hour period, to a cold solution of 6 g. of sodium borohydride in 50 cc. of 80% ethanol, the reaction temperature not being allowed to exceed 5°C. After completion of addition, the solution was kept at 0–5° C. for 2 hours further; then 200 cc. of 10% sodium hydroxide was added and the solution boiled for 15 minutes. Most of the solvent was removed in vacuo, the residue neutralized with 20% hydrochloric acid and the crystalline precipitate collected and washed. Recrystallization of the crude material from acetone furnished 20β-(2'-hydroxyethylthio)-Δ⁵-pregnen-3β-ol (Cpd. No. 25).

The compounds Nos. 18 to 23, inclusive, were treated according to the latter procedures, thus affording as final products:

Cpd. No.:
    26—20β-(2'-fluoroethylthio)-Δ⁵-pregnen-3β-ol,
    27—20β-(2'-chloroethylthio)-Δ⁵-pregnen-3β-ol,
    28—20β-(2'-carboxyethylthio)-Δ⁵-pregnen-3β-ol,
    29—20β-(3'-hydroxy-3'-methylbutylthio)-Δ⁵-pregnen-3β-ol,
    30—20β-(3'-methyl-but-2'-enylthio)-Δ⁵-pregnen-3β-ol,
    31—20β-(isoamylthio)-Δ⁵-pregnen-3β-ol.

Example XVIII

A solution of 500 mg. of compound No. 11 in 25 cc. of acetone was treated with 0.1 cc. of concentrated hydrochloric acid and the mixture kept at room temperature overnight. It was then poured into water containing 250 mg. of sodium hydroxide extracted with methylene chloride and the organic extract washed with water to neutral, dried over anhydrous sodium sulfate and evaporated to dryness. Crystallization from acetone-hexane gave 20β-(2'-[N,N-dimethylamino] ethylthio)-Δ⁴-pregnen-3-one (Cpd. No. 32).

Example XIX

The compound No. 32 was treated according to Example XVII, thus furnishing as final product: 20β-(2'-[N,N - dimethylamino]-ethylthio)-Δ⁵-pregnen-3β-ol (Cpd. No. 33).

Example XX

The compound No. 3 was successively treated according to Examples III, IV, V, VI and VII, thus yielding respectively:

Cpd. No.:
    34—20α-(2'-oxoethylthio)-Δ⁴-pregnen-3-one.
    35—20α-(carboxymethylthio)-Δ⁴-pregnen-3-one.
    36—3-cycloethylenedioxy-20α-(carboxymethylthio)-Δ⁵-pregnene,
    37—3-cycloethylenedioxy-20α-(2'-hydroxyethylthio)-Δ⁵-pregnene,
    38—3-cycloethylenedioxy-20α-(2'-tosyloxyethylthio)-Δ⁵-pregnene.

Example XXI

The compound No. 38 was treated according to Examples VIII, IX, X, and XI, thus yielding respectively:

Cpd. No.:
    39—3-cycloethylenedioxy-20α-(2'-fluoroethylthio)-Δ⁵-pregnene,
    40—3-cycloethylenedioxy-20α-(2'-chloroethylthio)-Δ⁵-pregnene,
    41—3-cycloethylenedioxy-20α-(2'-[N,N-dimethylamino]-ethylthio)-Δ⁵-pregnene,
    42—3-cycloethylenedioxy-20α-(2'-cyano-ethylthio)-Δ⁵-pregnene.

Example XXII

The compound No. 42 was treated successively in accordance with Examples XII, XIII, XIV and XV, thus yielding respectively:

Cpd. No.:
- 43—3-cycloethylenedioxy-20α-(2'-carboxyethylthio)-Δ⁵-pregnene,
- 44—3-cycloethylenedioxy-20α-(3'-hydroxy-3'-methylbutylthio)-Δ⁵-pregnene,
- 45—3-cycloethylenedioxy-(3'-methyl-but-2'-enylthio)-Δ⁵-pregnene,
- 46—3-cycloethylenedioxy-20α-(isoamylthio)-Δ⁵-pregnene.

*Example XXIII*

The compounds Nos. 37, 39, 40, 43, 44, 45 and 46 were treated according to Example XVI, thus yielding respectively:

Cpd. No.:
- 47—20α-(2'-hydroxyethylthio)-Δ⁴-pregnen-3-one,
- 48—20α-(2'-fluoroethylthio)-Δ⁴-pregnen-3-one,
- 49—20α-(2'-chloroethylthio)-Δ⁴-pregnen-3-one,
- 50—20α-(2'-carboxyethylthio)-Δ⁴-pregnen-3-one,
- 51—20α-(3'-hydroxy-3'-methylbutylthio)-Δ⁴-pregnen-3-one,
- 52—20α-(3'-methyl-but-2'-enylthio)-Δ⁴-pregnen-3-one,
- 53—20α-(isoamylthio)-Δ⁴-pregnen-3-one.

*Example XXIV*

The compounds Nos. 47 to 53, inclusive, were treated according to the procedures described in Example XVII, thus affording respectively, as final products:

Cpd. No.:
- 54—20α-(2'-hydroxyethylthio)-Δ⁵-pregnen-3β-ol,
- 55—20α-(2'-fluoroethylthio)-Δ⁵-pregnen-3β-ol,
- 56—20α-(2'-chloroethylthio)-Δ⁵-pregnen-3β-ol,
- 57—20α-(2'-carboxyethylthio)-Δ⁵-pregnen-3β-ol,
- 58—20α-(3'-hydroxy-3'-methylbutylthio)-Δ⁵-pregnen-3β-ol,
- 59—20α-(3'-methyl-but-2'-enylthio)-Δ⁵-3β-ol,
- 60—20α-(isoamylthio)-Δ⁵-pregnen-3β-ol.

*Example XXV*

The compound No. 41 was treated successively according to Examples XVIII and XIX, thus yielding respectively 20α-(2'-[N,N-dimethylamino]-ethylthio)-Δ⁴-pregnen-3-one (Cpd. No. 61) and 20α-(2'-[N,N-dimethylamino]-ethylthio)-Δ⁵-pregnen-3β-ol (Cpd. No. 62).

*Example XXVI*

The known 19-nor-pregnenolone (obtained according to U.S. Pat. No. 3,071,581) was treated according to Example I, thus yielding 20-cycloethylenedioxy-19-nor-Δ⁵-pregnen-3β-ol (Cpd. No. 63), which upon treatment by the procedure of Example II, yielded 20β-(2'-hydroxyethylthio)-19-nor-Δ⁵-pregnen-3β-ol (Cpd. No. 64) and 20α-(2'-hydroxyethylthio)-19-nor-Δ⁵-pregnen-3βol (Cpd. No. 65).

*Example XXVII*

The compound No. 64 was successively treated according to Examples III, IV, V, VI, and VII, thus yielding respectively:

Cpd. No.:
- 66—20β-(2'-oxoethylthio)-19-nor-Δ⁴-pregnen-3-one,
- 67—20β-(carboxymethylthio)-19-nor-Δ⁴-pregnen-3-one,
- 68—3-cycloethylenedioxy-20β-(carboxymethylthio)-19-nor-Δ⁵-pregnene,
- 69—3-cycloethylenedioxy-20β-(2'-hydroxyethylthio)-19-nor-Δ⁵-pregnene,
- 70—3-cycloethylenedioxy-20β-(2'-tosyloxyethylthio)-19-nor-Δ⁵-pregnene.

*Example XXVIII*

The compound No. 70 was treated according to Examples VIII, IX, X, and XI, thus yielding respectively:

Cpd. No.:
- 71—3-cycloethylenedioxy-20β-(2'-fluoroethylthio)-19-nor-Δ⁵-pregnene,
- 72—3-cycloethylenedioxy-20β-(2'-chloroethylthio)-19-nor-Δ⁵-pregnene,
- 73—3-cycloethylenedioxy-20β-(2'-[N,N-dimethylamino]ethylthio)-19-nor-Δ⁵-pregnene,
- 74—3-cycloethylenedioxy-20β-(2'-cyanoethylthio)-19-nor-Δ⁵-pregnene.

*Example XXIX*

The compound No. 74 was treated successively in accordance with Examples XII, XIII, XIV, and XV, thus yielding respectively:

Cpd. No.:
- 75—3-cycloethylenedioxy-20β-(2'-carboxyethylthio)-19-nor-Δ⁵-pregnene,
- 76—3-cycloethylenedioxy-20β-(3'-hydroxy-3'-methylbutylthio)-19-nor-Δ⁵-pregnene,
- 77—3-cycloethylenedioxy-20β-(3'-methyl-but-2'-enylthio)-19-nor-Δ⁵-pregnene,
- 78—3-cycloethylenedioxy-20β-(isoamylthio)-19-nor-Δ⁵-pregnene.

*Example XXX*

The compounds Nos. 69, 71, 72, 75, 76, 77 and 78 were treated according to Example XVI, thus yielding respectively:

Cpd. No.:
- 79—20β-(2'-hydroxyethylthio)-19-nor-Δ⁴-pregnen-3-one,
- 80—20β-(2'-fluoroethylthio)-19-nor-Δ⁴-pregnen-3-one,
- 81—20β-(2'-chloroethylthio)-19-nor-Δ⁴-pregnen-3-one,
- 82—20β-(2'-carboxyethylthio)-19-nor-Δ⁴-pregnen-3-one,
- 83—20β-(3'-hydroxy-3'-methyl-butylthio)-19-nor-Δ⁴-pregnen-3-one,
- 84—20β-(3'-methyl-but-2'-enylthio)-19-nor-Δ⁴-pregnen-3-one,
- 85—20β-(isoamylthio)-19-nor-Δ⁴-pregnen-3-one.

*Example XXXI*

The compounds Nos. 79 to 85, inclusive, were treated according to the procedures described in Example XVII, thus affording respectively, as final products:

Cpd. No.:
- 86—20β-(2'-hydroxyethylthio)-19-nor-Δ⁵-pregnen-3β-ol,
- 87—20β-(2'-fluoroethylthio)-19-nor-Δ⁵-pregnen-3β-ol,
- 88—20β-(2'-chloroethylthio)-19-nor-Δ⁵-pregnen-3β-ol,
- 89—20β-(2'-carboxyethylthio)-19-nor-Δ⁵-pregnen-3β-ol,
- 90—20β-(3'-hydroxy-3'-methylbutylthio)-19-nor-Δ⁵-pregnen-3β-ol,
- 91—20β-(3'-methyl-but-2'-enylthio)-19-nor-Δ⁵-pregnen-3β-ol,
- 92—20β-(isoamylthio)-19-nor-Δ⁵-pregnen-3β-ol.

*Example XXXII*

The compound No. 73 was treated successively according to Examples XVIII and XIX, thus yielding respectively: 20β-(2'-[N,N-dimethylamino] - ethylthio) - 19-nor-Δ⁴-pregnen-3-one (Cpd. No. 93) and 20β-(2'-[N,N-dimethylamino]ethylthio)-19-nor-Δ⁵-pregnen-3β-ol (Cpd. No. 94).

Example XXXIII

The compound No. 65 was successively treated according to Examples III, IV, V, VI, and VII, thus yielding respectively:

Cpd. No.:
- 95—20α-(2'-oxoethylthio)-19-nor-Δ⁴-pregnen-3-one,
- 96—20α-(carboxymethylthio)-19-nor-Δ⁴-pregnen-3-one,
- 97—3-cycloethylenedioxy-20α-(carboxymethylthio)-19-nor-Δ⁵-pregnene,
- 98—3-cycloethylenedioxy-20α-(2'-hydroxyethylthio)-19-nor-Δ⁵-pregnene,
- 99—3-cycloethylenedioxy-20α-(2'-tosyloxyethylthio)-19-nor-Δ⁵-pregnene.

Example XXXIV

The compound No. 99 was treated according to Examples VIII, IX, X, and XI, thus yielding respectively:

Cpd. No.:
- 100—3-cycloethylenedioxy-20α-(2'-fluoroethylthio)-19-nor-Δ⁵-pregnene,
- 101—3-cycloethylenedioxy-20α-(2'-chloroethylthio)-19-nor-Δ⁵-pregnene,
- 102—3-cycloethylenedioxy-20α-(2'-[N,N-dimethylamino]-ethylthio)-19-nor-Δ⁵-pregnene,
- 103—3-cycloethylenedioxy-20α-(2'-cyanoethylthio)-19-nor-Δ⁵-pregnene.

Example XXXV

The compound No. 103 was treated successively in accordance with Examples XII, XIII, XIV, and XV, thus yielding respectively:

Cpd. No.:
- 104—3-cycloethylenedioxy-20α-(2'-carboxyethylthio)-19-nor-Δ⁵-pregnene,
- 105—3-cycloethylenedioxy-20α-(3'-hydroxy-3'-methylbutylthio)-19-nor-Δ⁵-pregnene,
- 106—3-cycloethylenedioxy-20α-(3'-methyl-but-2'-enylthio)-19-nor-Δ⁵-pregnene,
- 107—3-cycloethylenedioxy-20α-isoamyloxy-19-nor-Δ⁵-pregnene.

Example XXXVI

The compounds Nos. 98, 100, 101, 104, 105, 106 and 107 were treated according to Example XVI, thus yielding respectively:

Cpd. No.:
- 108—20α-(2'-hydroxyethylthio)-19-nor-Δ⁴-pregnen-3-one,
- 109—20α-(2'-fluoroethylthio)-19-nor-Δ⁴-pregnen-3-one,
- 110—20α-(2'-chloroethylthio)-19-nor-Δ⁴-pregnen-3-one,
- 111—20α-(2'-carboxyethylthio)-19-nor-Δ⁴-pregnen-3-one,
- 112—20α-(3'-hydroxy-3'-methyl-butythio)-19-nor-Δ⁴-pregnen-3-one,
- 113—20α-(3'-methyl-but-3'-enylthio)-19-nor-Δ⁴-pregnen-3-one,
- 114—20α-(isoamylthio)-19-nor-Δ⁴-pregnen-3-one.

Example XXXVII

The compounds Nos. 108 to 114, inclusive, were treated according to the procedures described in Example XVII thus affording respectively, as final products:

Cpd. No.:
- 115—20α-(2'-hydroxyethylthio)-19-nor-Δ⁵-pregnen-3β-ol,
- 116—20α-(2'-fluoroethylthio)-19-nor-Δ⁵-pregnen-3β-ol,
- 117—20α-(2'-chloroethylthio)-19-nor-Δ⁵-pregnen-3β-ol,
- 118—20α-(2'-carboxyethylthio)-19-nor-Δ⁵-pregnen-3β-ol,
- 119—20α-(3'-hydroxy-3'-methylbutylthio)-19-nor-Δ⁵-pregnen-3β-ol,
- 120—20α-(3'-methyl-but-2'-enylthio)-19-nor-Δ⁵-pregnen-3β-ol,
- 121—20α-(isoamylthio)-19-nor-Δ⁵-pregnen-3β-ol.

Example XXXVIII

The compound No. 102 was treated successively according to Examples XVIII and XIX, thus yielding respectively:

20α-(2'-[N,N-dimethylamino]ethylthio)-19-nor-Δ⁴ - pregnen-3-one (Cpd. No. 122) and 20α-(2'-[N,N-dimethylamino]ethylthio)-19-nor-Δ⁵ - pregnen - 3β - ol (Cpd. No. 123).

Example XXXIX

A mixture of 1 g. of 20β-(2'-hydroxyethylthio)-Δ⁴-pregnen-3-one (Cpd. No. 17), 4 cc. of pyridine and 2 cc. of acetic anhydride was kept at room temperature overnight, poured into ice water, the formed precipitate was filtered, washed with water and dried. Crystallization from acetone-hexane gave 20β-(2'-acetoxyethylthio)-Δ⁴-pregnen-3-one (Cpd. No. 124).

The compounds Nos. 25 to 31, inclusive, 54 to 60, inclusive, 86 to 92, inclusive, and 115 to 121, inclusive, were treated by the above procedure, thus affording respectively:

Cpd. No.:
- 125—20β-(2'-acetoxyethylthio)-Δ⁵-pregnen-3β-ol acetate,
- 126—20β-(2'-fluoroethylthio)-Δ⁵-pregnen-3β-ol acetate,
- 127—20β-(2'-chloroethylthio)-Δ⁵-pregnen-3β-ol acetate,
- 128—20β-(2'-carboxyethylthio)-Δ⁵-pregnen-3β-ol acetate,
- 129—20β-(3'-hydroxy-3'-methylbutylthio)-Δ⁵-pregnen-3β-ol acetate,
- 130—20β-(3'-methyl-but-2'-enylthio)-Δ⁵-pregnen-3β-ol acetate,
- 131—20β-(isoamylthio)-Δ⁵-pregnen-3β-ol acetate,
- 132—20α-(2'-acetoxyethylthio)-Δ⁵-pregnen-3β-ol acetate,
- 133—20α-(2'-fluoroethylthio)-Δ⁵-pregnen-3β-ol acetate,
- 134—20α-(2'-chloroethylthio)-Δ⁵-pregnen-3β-ol acetate,
- 135—20α-(2'-carboxyethylthio)-Δ⁵-pregnen-3β-ol acetate,
- 136—20α-(3'-hydroxy-3'-methylbutylthio)-Δ⁵-pregnen-3β-ol acetate,
- 137—20α-(3'-methyl-but-2'-enylthio)-Δ⁵-pregnen-3β-ol acetate,
- 138—20α-(isoamylthio)-Δ⁵-pregnen-3β-ol acetate,
- 139—20β-(2'-acetoxyethylthio)-19-nor-Δ⁵-pregnen-3β-ol acetate,
- 140—20β-(2'-fluoroethylthio)-19-nor-Δ⁵-pregnen-3β-ol acetate,
- 141—20β-(2'-chloroethylthio)-19-nor-Δ⁵-pregnen-3β-ol acetate,
- 142—20β-(2'-carboxyethylthio)-19-nor-Δ⁵-pregnen-3β-ol acetate,
- 143—20β-(3'-hydroxy-3'-methylbutylthio)-19-nor-Δ⁵-pregnen-3β-ol acetate,
- 144—20β-(3'-methyl-but-2'-enylthio)-19-nor-Δ⁵-pregnen-3β-ol acetate,
- 145—20β-(isoamylthio)-19-nor-Δ⁵-pregnen-3β-ol acetate,
- 146—20α-(2'-acetoxyethylthio)-19-nor-Δ⁵-pregnene-3β-ol acetate,
- 147—20α-(2'-fluoroethylthio)-19-nor-pregnen-3β-ol acetate, 148—20α-(2'-chloroethylthio)-19-nor-Δ⁵-pregnen-3β-ol acetate,
149—20α-(2'-carboxyethylthio)-19-nor-Δ⁵-pregnen-3β-ol acetate,
150—20α-(3'-hydroxy-3'-methylbutylthio)-19-nor-Δ⁵-pregnen-3β-ol acetate,
151—20α-(3'-methyl-but-2'-enylthio)-19-nor-Δ⁵-pregnen-3β-ol acetate,
152—20α-(isoamylthio)-19-nor-Δ⁵-pregnen-3β-ol acetate.

The compounds Nos. 33, 47, 62, 79, 94, 108 and 123 were treated by the above procedure, thus furnishing respectively:

Cpd. No.:
153—20β-(2'-[N,N-dimethylamino]ethylthio)-Δ⁵-pregnen-3β-ol acetate,
154—20α-(2'-acetoxyethylthio)-Δ⁴-pregnen-3-one,
155—20α-(2'-[N,N-dimethylamino]ethylthio)-Δ⁵-pregnen-3β-ol acetate,
156—20β-(2'-acetoxyethylthio)-19-nor-Δ⁴-pregnen-3-one,
157—20β-(2'-[N,N-dimethylamino]ethylthio)-19-nor-Δ⁵-pregnen-3β-ol acetate,
158—20α-(2'-acetoxyethylthio)-19-nor-Δ⁴-pregnen-3-one,
159—20α-(2'-[N,N-dimethylamino]ethylthio)-19-nor-Δ⁵-pregnen-3β-ol acetate.

*Example XL*

The starting compounds of Example XXXIX were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

I claim:
1. A compound represented by the general formula:

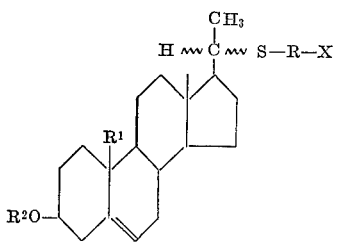

wherein R represents an aliphatic hydrocarbon residue containing from 1 to 7 carbon atoms, inclusive; R¹ is selected from the group consisting of hydrogen and methyl; R² is selected from the group consisting of hydrogen and a hydrocarbon carboxylic acyl group containing less than 12 carbon atoms, and X is selected from the group consisting of hydrogen, halogen, an N,N-dialkylamino group, a hydroxyl group, an acyl group containing less than 12 carbon atoms, a cyano group and a carboxyl group.

2. A compound represented by the general formula:

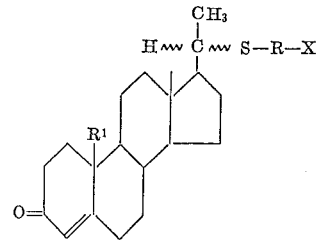

wherein R represents an aliphatic hydrocarbon residue containing from 1 to 7 carbon atoms, inclusive; R¹ is selected from the group consisting of hydrogen and methyl, and X is selected from the group consisting of hydrogen, halogen, an N,N-dialkylamino group, a hydroxyl group, a hydrocarbon carboxylic acyl group containing less than 12 carbon atoms, a cyano group and a carboxyl group.

3. 20-(2'-hydroxyethylthio)-Δ⁵-pregnen-3β-ol.
4. 20-(2'-fluoroethylthio)-Δ⁵-pregnen-3β-ol.
5. 20-(2'-chloroethylthio)-Δ⁵-pregnen-3β-ol.
6. 20-(2'-carboxyethylthio)-Δ⁵-pregnen-3β-ol.
7. 20-[2'-(N,N-dimethylamino)-ethylthio] - Δ⁵ - pregnen-3β-ol.
8. 20-(2'-hydroxyethylthio)-19-nor-Δ⁵-pregnen-3β-ol.
9. 20-(2'-fluoroethylthio)-19-nor-Δ⁵-pregnen-3β-ol.
10. 20-(2'-chloroethylthio)-19-nor-Δ⁵-pregnen-3β-ol.
11. 20-(2'-carboxyethylthio)-19-nor-Δ⁵-pregnen-3β-ol.
12. 20-[2'-(N,N-dimethylamino)-ethylthio] - Δ⁵ - pregnen-3β-ol.
13. 20-(2'-hydroxyethylthio)-Δ⁴-pregnen-3-one.
14. 20-(2'-fluoroethylthio)-Δ⁴-pregnen-3-one.
15. 20-(2'-chloroethylthio)-Δ⁴-pregnen-3-one.
16. 20-(2'-carboxyethylthio)-Δ⁴-pregnen-3-one.
17. 20-[2'-(N,N-dimethylamino)-ethylthio] - Δ⁴ - pregnen-3-one.
18. 20-(2'-hydroxyethylthio)-19-nor-Δ⁴-pregnen-3-one.
19. 20-(2'-fluoroethylthio)-19-nor-Δ⁴-pregnen-3-one.
20. 20-(2'-chloroethylthio)-19-nor-Δ⁴-pregnen-3-one.
21. 20-(2'-carboxyethylthio)-19-nor-Δ⁴-pregnen-3-one.
22. 20-[2'-(N,N-dimethylamino)-ethylthio] - 19 - nor-Δ⁴-pregnen-3-one.

References Cited in the file of this patent
Barton et al.: Journ. Chem. Soc. (1962), page 1967.